Aug. 8, 1961  P. G. K. SMITHERS  2,994,900
WINDSCREEN WIPERS
Filed July 1, 1960

Inventor
Phillip Geoffrey Kent Smithers
By
Bean, Brooks, Buckley & Bean
Attorney

United States Patent Office 2,994,900
Patented Aug. 8, 1961

2,994,900
WINDSCREEN WIPERS
Phillip Geoffrey Kent Smithers, Ealing, England, assignor to Trico Products Corporation, Buffalo, N.Y., a corporation of New York
Filed July 1, 1960, Ser. No. 40,293
5 Claims. (Cl. 15—250.34)

This invention concerns the connection between a wiper driving shaft and a wiper arm, the arm being of the kind consisting of a socket detachably fixed to the shaft, and an outer part pivoted to the socket and urged towards the screen by a spring acting between the socket and the outer part.

In a connection according to the present invention there is a sleeve housed within the socket with at least limited freedom of axial and rotary movement relative to the socket, the sleeve being internally keyed to fit on and receive torque from a wiper shaft having a free end, and the sleeve having external longitudinal splines on a truncated conical surface, the smaller end of which is, in use, further from the free end of the wiper shaft, and the socket having a truncated conical splined surface which is complementary to the splined surface on the sleeve.

Normally, in use, the splines are in interengagement, and transmit torque, from the sleeve to the socket. It is however possible to displace the socket relatively to the sleeve in the direction away from the free end of the wiper shaft, and this movement disengages the splines, whereupon the angular position of the socket relative to the sleeve may be adjusted, and the socket and sleeve then returned into interengagement. This facility of adjustment is obtained without the arm ever being removed from the shaft.

Figure 1:
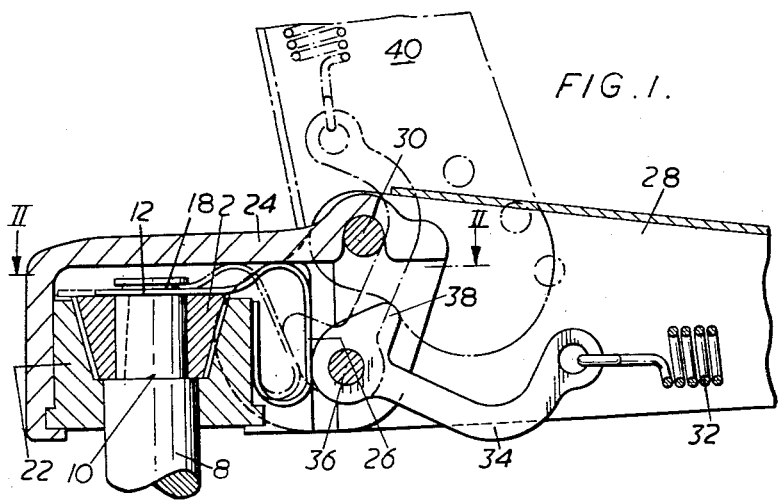
Figure 2:
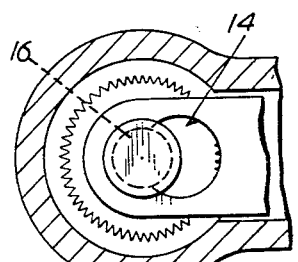
Figure 3:
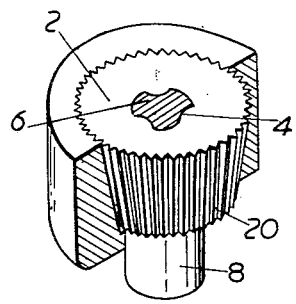
Figure 4:
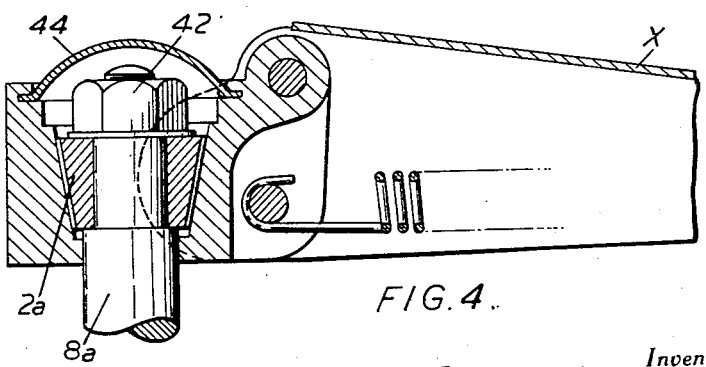

The accompanying drawings show two examples of connections according to the present invention. In these drawings:

FIGURE 1 is a fragmentary longitudinal section through one connection;
FIGURE 2 is a fragmentary section on the line II—II in FIGURE 1;
FIGURE 3 is a perspective view of the top of the sleeve and part of the socket, the part of the socket being broken away; and
FIGURE 4 is a fragmentary longitudinal section through a second connection.

In the connection shown in FIGURES 1 to 3 the sleeve 2 is internally keyed as shown in FIGURE 3 at 4 and fits on to the correspondingly keyed end 6 of a wiper shaft 8. The sleeve butts against a shoulder 10 on the shaft, and is retained by a latch plate 12 which bears against the upper face of the sleeve and has an opening 14 in the form of a hole with a narrower lateral extension 16, this extension cooperating with a recess 18 around the shaft.

The outer surface of the sleeve 2 is a truncated cone with a large number of longitudinal splines 20. These cooperate with splines in a member 22 which forms part of the socket 24. FIGURE 1 shows a normal position of the parts, with the splines in interengagement. The socket 24 can be depressed relatively to the shaft 8 and sleeve 2, sufficiently to disengage the splines and allow the socket to be turned relatively to the shaft 8.

The latch plate 12 is one end of a metal strip the other end of which is bent into a hairpin spring 26. The arm has an outer part 28 pivoted to the socket at 30 and urged towards a windscreen by a tension spring 32 anchored to a link 34 which is pivoted to the socket at 36. The link 34 includes a part 38 formed as a cam. If the arm part 28 is pulled away from the windscreen into the position shown in broken lines 40, then the cam 38 deforms the hairpin spring 26 and displaces the latch plate 12 so that the hole 40 is aligned with the axis of the sleeve 2, and the sleeve and socket may then be bodily separated from the shaft 8.

In the arrangement shown in FIGURE 4, there is no latch. Instead the sleeve 2a is held on the shaft 8a by a nut 42 which is concealed by a cover 44, either snapped or twisted into a secure position.

In both constructions it is found that the spring 32 serves to hold the splines normally in interengagement. This is because the outer part 28 carries a wiper blade (not shown) which is pressed against the windscreen. In reaction to this, there is a force urging the entire arm away from the windscreen, and thus urging the socket 24 upwards as seen in FIGURES 1 and 4. The force also tends to tilt the socket 24 anticlockwise as seen in FIGURES 1 and 4, and thus bind the splines frictionally together.

I claim:
1. A windscreen wiper arm mounting socket, and a sleeve housed within the socket with at least limited freedom of axial and rotary movement relative to the socket, the sleeve being internally keyed to fit on and receive torque from a wiper shaft having a free end, and the sleeve having external longitudinal splines on a truncated conical surface, the smaller end of which is, in use, further from the free end of the wiper shaft, and the socket having a truncated conical splined surface which is complementary to the splined surface on the sleeve.
2. A socket according to claim 1 including a latch engageable with the extremity of the wiper shaft after insertion through the sleeve.
3. A socket according to claim 2 in which the latch is a plate, which is mounted in the socket adjacent the larger end of the sleeve to slide along a diameter of the socket, and in which is an opening in the form of a hole with a narrower lateral extension, and there is a spring urging the plate to a position in which the extension is aligned with the axis of the sleeve.
4. A socket according to claim 3 and an outer arm pivoted to the socket, and means operated by the outer arm upon swinging away from a windscreen and serving to displace the latch to a position in which the hole is aligned with the axis of the sleeve.
5. A combination of a socket according to claim 2 and a wiper shaft having a free end which is complementary to the internal keying of the sleeve, and which is recessed to cooperate with the latch.

References Cited in the file of this patent
UNITED STATES PATENTS
2,885,230    Terpin _____ May 5, 1959
FOREIGN PATENTS
835,020    France _____ Sept. 12, 1938